(12) United States Patent
Norum et al.

(10) Patent No.: US 7,866,697 B2
(45) Date of Patent: Jan. 11, 2011

(54) RELEASABLE HOLDING MECHANISM AND METHOD OF USE

(75) Inventors: Viggo L. Norum, Kongsberg (NO); Bård Vestgård, Lier (NO); Jan Øyen, Skollenborg (NO); Øivind Grønli, Krokstadelva (NO); Georg B. Jenssen, Gjøvik (NO); Roald Helland Pedersen, Gjøvik (NO)

(73) Assignees: Kongsberg Devotek AS, Kongsberg (NO); Benteler Automobiltechnik GmbH, Paderborn (DE)

( * ) Notice: Subject to any disclaimer, the term of this patent is extended or adjusted under 35 U.S.C. 154(b) by 205 days.

(21) Appl. No.: 11/922,490

(22) PCT Filed: Jun. 21, 2006

(86) PCT No.: PCT/NO2006/000237

§ 371 (c)(1),
(2), (4) Date: Jul. 1, 2008

(87) PCT Pub. No.: WO2006/137745

PCT Pub. Date: Dec. 28, 2006

(65) Prior Publication Data

US 2009/0121466 A1    May 14, 2009

(30) Foreign Application Priority Data

Jun. 21, 2005 (WO) ............... PCT/NO2005/000218
Oct. 27, 2005 (NO) ................................... 20055022
Dec. 2, 2005 (NO) ................................... 20055710

(51) Int. Cl.
*B60R 21/13* (2006.01)
*E05B 47/00* (2006.01)

(52) U.S. Cl. ...................................... 280/756; 70/276

(58) Field of Classification Search ................. 180/282; 280/756; 70/276, 277, 278.1; 296/180.5, 296/85, 121, 36; 292/95, 121, 128, 194, 292/216, 219, 220, 228
See application file for complete search history.

(56) References Cited

U.S. PATENT DOCUMENTS 4,958,851 A * 9/1990 Behr et al. .................. 280/735
(Continued)

FOREIGN PATENT DOCUMENTS

DE    4307963    9/1994
(Continued)

OTHER PUBLICATIONS

Machine Translation of EP0916552A1.*
(Continued)

*Primary Examiner*—Paul N Dickson
*Assistant Examiner*—Joseph Rocca
(74) *Attorney, Agent, or Firm*—Wenderoth, Lind & Ponack, L.L.P.

(57) ABSTRACT

The invention relates to a releasable holding mechanism which may be used to hold and release a roll bar in a roll over protection system. The roll bar is often made part of the seat structure of vehicle, or a part of the chassis of the vehicle. The releasable holding mechanism will be fastened rigidly or slightly loose to the roll bar frame, seat frame or the chassis of the vehicle. Between the roll bar and the releasable holding mechanism there will be a connection element that is rigidly or slightly loosely fastened to the roll bar. The arrangement of fastening the connection element rigidly or slightly loosely depends on the tolerances for positioning the actuator towards the roll bar. The connection element is locked or released by the releasable holding mechanism. The releasable holding mechanism is locked/-engaged when the roll bar is pushed downwards whereby the connection element is forced into the releasable holding mechanism. The releasable holding mechanism is to release the connecting element when a signal is sent to the release element of the holding mechanism. The releasable holding mechanism can be activated by one short duration pulse, for instance a pulse from an electronic control unit for activation of airbags in a vehicle. The system can be activated with low energy demands.

16 Claims, 9 Drawing Sheets

U.S. PATENT DOCUMENTS 5,626,361 A * 5/1997 Heiner .................. 280/756
6,352,285 B1 * 3/2002 Schulte et al. ............ 280/756
6,817,628 B2 * 11/2004 Hovelmann et al. ......... 280/756

FOREIGN PATENT DOCUMENTS

| DE | 19830407 | | 1/2000 |
|---|---|---|---|
| DE | 10215054 | | 10/2003 |
| DE | 20304945 | U1 * | 8/2004 |
| DE | 10351367 | | 2/2005 |
| DE | 10345689 | | 4/2005 |
| EP | 0916552 | | 5/1999 |
| EP | 1493635 | | 1/2005 |
| EP | 1557341 | | 7/2005 |

OTHER PUBLICATIONS

Machine Translation of DE10345689A1.*
International Search Report issued Oct. 4, 2006 in the International (PCT) Application of which the present application is the U.S. National Stage.
Patent Cooperation Treaty (PCT) International Preliminary Report on Patentability, issued Oct. 22, 2007 in International Application No. PCT/NO2006/000237.

* cited by examiner

RELEASABLE HOLDING MECHANISM AND METHOD OF USE

BACKGROUND OF THE INVENTION

I. Field of the Invention

The present invention relates to a releasable holding mechanism with means for retaining the mechanism in a locked condition and to a method for actuating the mechanism, and is concerned particularly, although not exclusively, with a releasable holding mechanism for use in automotive roll-over protection systems (ROPS), releasable headrest, backrest, raisable hood for pedestrian protection and other automotive applications.

The invention is designed especially for ROPS, but it may be applied otherwise where there is a need for releasing a secured load, e.g. safety systems at sea, life rafts (as an alternative to rope-cutter devices), securing and releasing cargo, and release mechanisms for aero/space, etc.

II. Description of the Related Art

The Roll Over Protection System (ROPS) is installed in a vehicle to protect the driver and passengers if the vehicle should roll over. During normal driving the roll over bar or the protection member is stored in a lower, retracted position. The roll bar is only released and raised to an upper position when a roll over situation occurs and a signal is received from one or several sensors in the vehicle.

Known roll bars are normally sprung towards the upper position, but are held back in the lower position by a releasable holding mechanism, holding the roll bar via one or more connecting elements. Thus the holding mechanism in a locked position will keep the roll bar in the lower position and the holding mechanism in a released position allows the roll bar to be raised to the upper position.

The ROPS may comprise one or more separate roll bars or protection members using one holding mechanism for each. Several protection members may also be connected together using one holding mechanism. The holding mechanism to be used in a roll over protection system faces several problems:

- Rough environmental conditions such as vibrations, tilting, dust and moisture that can cause the roll bars to either fasten in a lower position or release unintentionally.
- Tolerances and deflections in the vehicle chassis create positioning problems and might cause the roll bar to release unintentionally or fasten.
- The power and energy consumption of the release mechanism should be very low to avoid the need for extra power supplies like electrical capacitors. Ideally the mechanism could be powered directly by the crash control unit.
- The holding mechanism should be regenerative. That means that the roll bar connection element should snap into locked position again after being released when it is pushed\pulled down manually or by another force.

According to relevant prior art, releasable holding mechanisms to be used in a roll over protecting system are either activated by electromechanical or pyrotechnical devices. The roll bar is kept in its lower position by a mechanical catch holding element until a signal is given and the roll bar is released. Such mechanisms rely on an active release arrangement whereby some form of actuator is energized in order to move a piston or rod element to unlock the catch holding element which in turn releases the roll bar for deployment.

The pyrotechnical actuators are based on the principle that a small amount of propellant is ignited, and the pressure energy is used to disconnect the locking mechanism. The main problem is that they are not regenerative and after being used they must be replaced.

The electromechanical actuators such as the one disclosed in DE 100 02 723 are known to have a connection rod between the roll bar and the actuator. This connection rod is more or less directly connected to a release solenoid using e.g. a ramp (cone) and ball(s) to lock the roll bar in the lower position. This solution is disadvantageous in that a minor tilting of the connection rod leads to movement directly in the release mechanisms locking balls. As a result the roll bar may be released unintentionally. The mechanism is also partly open for pollution. The direct connection between the connection rod and the release mechanism requires high power and energy consumption when the actuator releases, because the actuator must work against most of the spring load.

Another example of a release mechanism comprising a solenoid actuator is a release mechanism as described in the patent specification U.S. Pat. No. 5,626,361, in the name Bayerische Motoren Werke AG.

In U.S. Pat. No. 5,228,730 there is disclosed an apparatus for converting mechanical locks to operate electrically using momentary power. A lock knob can be arrested by means of a locking pin. The movement of the locking pin is generated by means of a combined electromagnet and a permanent magnet together with a spring. By alternating the polarity of the power, the position of the locking pin can be alternated between a locked position and an unlocked position. This solution does not relate to hold and release of a pre-tensioned connecting element.

SUMMARY OF THE INVENTION

The present invention sets out to overcome the problems of the known mechanisms.

In accordance with the present invention, there is provided a mechanism that can be operated with a minimum of energy. Further, in automotive applications the release action can be controlled by management systems already available in the vehicle.

In accordance with one embodiment of the invention there is provided a releasable holding mechanism that does not necessarily require a mechanical catch to keep the mechanism in a locked position but uses a magnetic force to retain the holding means of the mechanism in a secured condition.

Preferably, the releasable holding mechanism comprises a permanent magnet that provides the first magnetic force for retaining the holding means in a locked position.

Alternatively, the releasable holding mechanism preferably comprises an electro-magnet and a power source that provides the first magnetic force for keeping the holding means in a locked position.

The releasable holding mechanism preferably comprises release means comprising a second magnetic force that is useable to opposes the first magnetic force, the arrangement being such that, in use, the resultant magnetic force of the first magnetic force and second magnetic force is insufficient to prevent the holding means moving from the locked position to the unlocked position wherein the connecting element is released.

The releasable holding mechanism preferably comprises an electromagnet and a power source for providing the second magnetic force and control means for activating the electromagnet.

The present invention sets out to overcome the problems of the known mechanisms by providing a releasable holding mechanism that does not necessarily require a solenoid or other types of movable actuator to initiate the release function of the mechanism but uses a second magnetic force to reduce the first magnetic force to such an extent that resultant magnetic force is not sufficient to prevent movement of the holding means and the connecting element is released.

The holding means preferably comprises at least one pivotable element, the arrangement being such that in the locked position a first portion of the pivotable element is in operative engagement with the connecting element and a second portion of the pivotable element is in operative association with, and retainable by, the first magnetic force.

In an embodiment of the present invention it is preferable that the releasable holding mechanism comprises auxiliary means for initiating the turning of the lever from the locked position to the unlocked position in conjunction with the second magnetic force. It is also preferable that the auxiliary means for initiating the turning of the lever comprises a spring element that urges the lever from the locked position to the unlocked position.

The spring element preferably comprises a helical spring, the arrangement being such that in the locked position of the holding mechanism the helical spring applies a turning force to the second distal end of the lever, which urges the lever to the unlocked position. Preferably, the force exerted on the lever by the connecting element is in a general direction extending away from the second distal end of the lever.

In order to help achieve an good contact between the lever and the first magnetic field it is preferable that the lever comprises a second pivot region disposed between the first pivot and the second distal end, the second distal end being pivotable about the second pivot region and arrangement being such that in locked position the second pivot region allows the second distal end to self align with the magnetic force for preventing movement of the holding means.

The holding mechanism may be situated in a unclean environment and it may be preferable that the releasable holding mechanism comprises a sealed housing that contains the second distal end of the lever, the first magnetic force for preventing movement of the lever in the locked position and the release means comprising the second magnetic force that is useable to oppose the first magnetic force. The housing will protect the contact surfaces of the magnet and the second distal end of the lever and therefore improve the magnetic attraction between the two elements.

Preferably, the second magnetic force is provided by an electromagnet and a power source. The electromagnet preferably comprises a flexible attachment to the sealed housing and the arrangement being such that in the locked position the flexible attachment allows the electromagnet to self align with the second distal end.

Another feature that may improve the magnetic attraction between the second distal end and the magnet is that the lever is preferably formed with a hole through which the pivot extends, the hole being of a diameter that is sufficiently greater than the diameter of the pivot such that the second distal end may self align with the first magnetic force.

The permanent magnet is preferably attached stationary to the housing, and preferably it is a part of a electromagnet unit, the arrangement being such that, in use, the second distal end of the lever is separated from the permanent magnet and moves in a direction away from the permanent magnet when the lever moves from the locked position to the unlocked position. Alternatively, the permanent magnet is attached to, or forms part of, the second distal end of the lever, the arrangement being such that, in use, the second distal end of the lever and the permanent magnet move in a direction away from the origin of second magnetic force when the lever moves from the locked position to the unlocked position.

The skilled person shall appreciate that the general principle of the present invention may be used for a wide variety of releasable holding mechanisms. However, it is preferable that the holding mechanism comprises a mechanical reduction arrangement for reducing the force that the connecting element applies to the releasable holding mechanism such that the turning force that urges the holding means towards the unlocked position is reduced hence the magnetic force required to prevent movement of the holding means does not have to be so large.

Preferably, the arrangement for reducing the effective magnetic force required to prevent movement of the holding means comprises a mechanical reduction arrangement having a ratio of 5:1 or more.

The present invention may be used to hold and raise a roll bar in a roll over protection system. The roll bar is often made part of the seat structure of vehicle, or a part of the chassis of the vehicle. The releasable holding mechanism will be fastened rigidly or slightly loose to the roll bar frame, seat frame or the chassis of the vehicle. Between the roll bar and the releasable holding mechanism there will be a connection element that is rigidly or slightly loosely fastened to the roll bar. The arrangement of fastening the connection element rigidly or slightly loosely depends on the tolerances for positioning the actuator towards the roll bar. The connection element is locked or released by the releasable holding mechanism. The releasable holding mechanism is locked/engaged when the roll bar is pushed downwards whereby the connection element is forced into the releasable holding mechanism. The releasable holding mechanism is to release the connecting element when a signal is sent to the release element of the holding mechanism.

In accordance with the present invention there is achieved one releasable holding mechanism that can be released fast with low energy demands. The releasing action is activated by the movement of a lever, for instance a pivoting lever securing the locking of a connecting member at one distal end. The movement of the lever is balanced between a static holding force provided for instance by a permanent magnet that generates a holding torque, and one opposing releasing force provided for instance by a pre-charged spring, generating a unlocking torque that is lower than said holding torque. In the releasing action, one electromagnet can be energized to act upon the lever with an assisting unlocking torque that together with the pre-charged spring overcomes said holding torque. If the connecting element is pre-tensioned in its release direction or if it affects the torque balance of the lever in other ways, this can be accounted for by introducing an off-center arrangement of the pivot axis of the lever.

These and further improvements and advantages can be achieved with the present invention as defined in the accompanying claims.

BRIEF DESCRIPTION OF THE DRAWINGS

The invention shall be further described by examples and figures where.

DETAILED DESCRIPTION OF THE INVENTION

Figure 1:
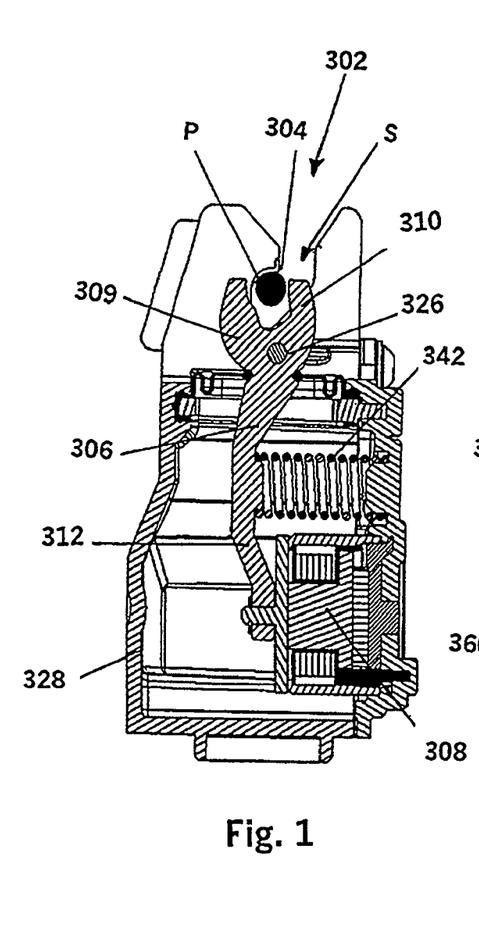
FIG. 1 is a side view of a partial cross-section of a firsts first embodiment of a release holding mechanism and a connecting element in a locked position.
Figure 2:
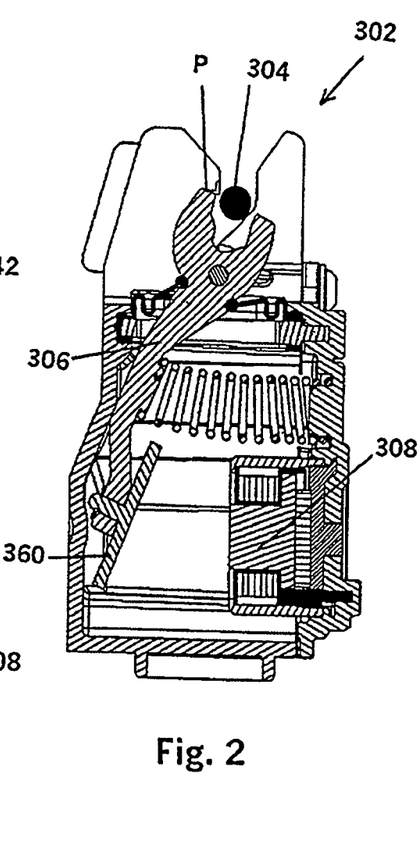
FIG. 2 is a side view of a partial cross-section of the releaseable holding mechanism and the connecting element shown in FIG. 1, in an unlocked position.
Figure 3:
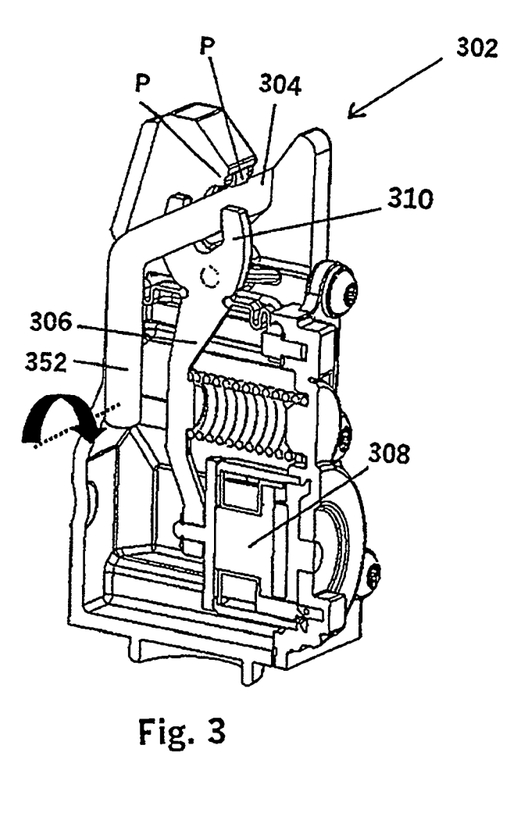
FIG. 3 is an isometric, perspective view of a partial cross-section of the releasable holding mechanism and a connecting element of FIG. 1 in a locked position.

With reference to FIGS. 1-3, there is shown a first embodiment of a releasable holding mechanism 302 for locking and releasing a connecting element 304. The releasable holding mechanism 302 comprises holding means or unit for retaining the connecting element 304 in a locked position in the form of a protrusion P and a pivotable lever 306 with at least one notch 310 and further means for preventing movement of the lever 306 from the locked position (as shown in FIGS. 1 and 3) to an unlocked position (as shown in FIG. 2) (e.g. a release unit) is provided by the attractive magnetic force for instance of a permanent magnet. The lever 306 is capable of being influenced by a magnetic force of said permanent magnet; this magnetic force retains the lever 306 in the locked position. The axis 326 of said pivot is preferably arranged in the same base element or housing as the protrusion P. The releasable holding mechanism 302 comprises a combined magnet unit 308 comprising a permanent magnet and an electromagnet. The electromagnet can be connected to a power source (not shown) via one or more wires and is activated by a control unit (not shown). As in previous embodiments, the holding mechanism can be provided with a spring 342 acting upon the lever 306. The spring urges the lever to rotate about its pivot 326 in a direction away from the magnet and thus serving as an assisting force when the magnet is activated to perform a releasing action. The force represented by the spring and acting upon the lever 306 must be lower than the holding action performed by the magnet, but sufficient to (in co-operation with the force generated by the electromagnet) move the lever 306 to act with its notch 309 upon the connecting element 304 to move the connecting element 304 out of the position beneath the protrusion P, thus allowing the connecting element to be released. The connecting element should be allowed to move slightly in its transversal direction.

As shown in FIG. 1, there is a gap between the inward leg (notch 309) of the "U" shaped extension of the lever 306 and the connecting element 304. The gap is preferably designed to allow the lever 306 to obtain a certain velocity before abutting the connecting element 304. Thus the lever 306 will be charged with momentum and kinetic energy by means of the spring and the magnetic resultant force before it abuts onto and moves the connecting element in a transversal direction.

Preferably, the protrusion P can be provided with one or more insert p (FIG. 3) having a shape complementary to that of the connecting element 304, and being of a low friction material, to secure a proper holding and a smooth release action.

Further, a plate 360 (FIG. 2) is attached to one lower part of the lever 306. The plate should be attached to the lever in a tilting manner, to secure that a planar contact with the magnet unit 308 can be achieved. Alternatively, the magnet unit 308 can be fixed in the housing in a flexible manner to secure said planar contact.

In a further alternative embodiment (not shown) of the present invention the second distal end 312 of the lever comprises the permanent magnet. In this arrangement the permanent magnet will rotate with the lever when the electromagnet is activated.

As can be seen in FIG. 3, the connecting element 304 can be formed as a bar with a straight part having arms or studs 352 at its ends (only one shown). These studs can be rotatably fixed to a movable part, such as a releasable roll bar of a roll over protection system in automotive applications. Preferably the center of the stud axis and the straight part 354 can have a minor offset to generate a forcing action upon the connecting element in the direction opposite to that of the releasing direction relative the protrusion P.

In this embodiment the connecting element is shown in a "standing" arrangement, here the straight part represents one upper part and the studs 352 (only one shown) lower parts of the element. However, one alternative to this arrangement is to arrange the connecting element in a "hanging" manner where the connecting element is rotated 180 degrees relative the axis of the straight part, where the studs are extending upwards.

Figure 4:
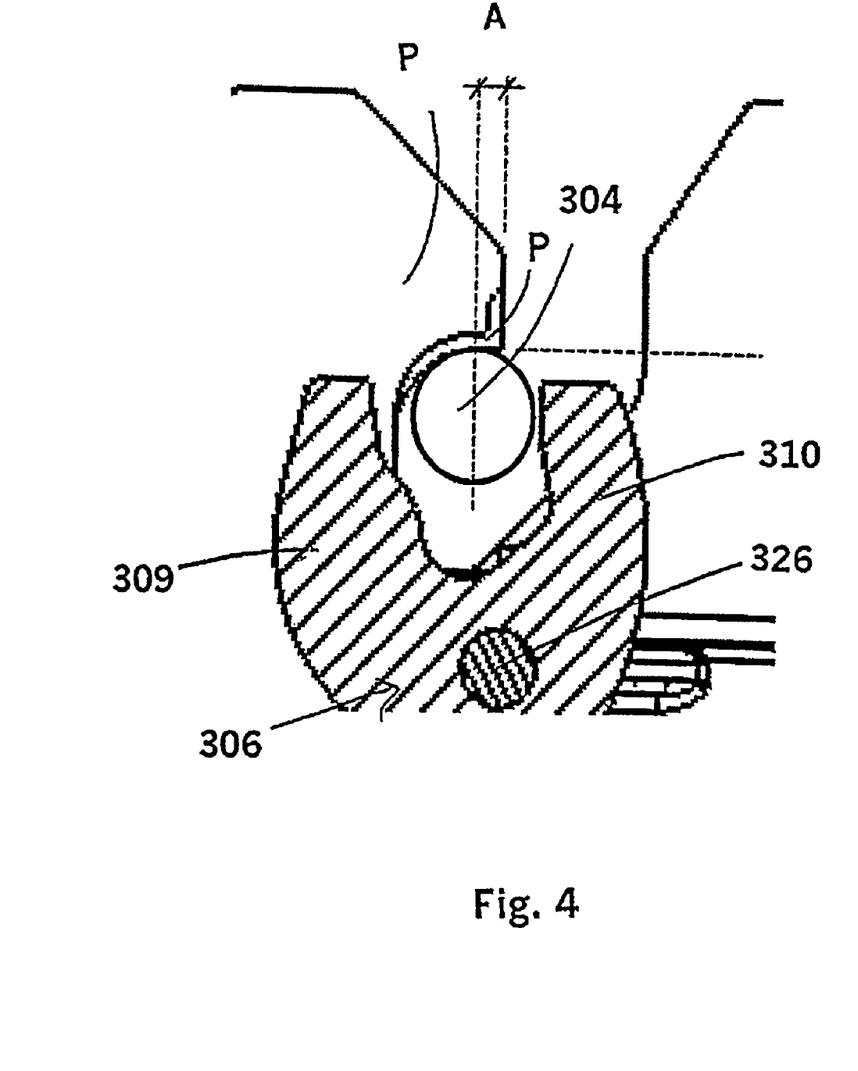
FIG. 4 discloses details regarding the hold/release function, represented by an enlarged cut-out of FIG. 1.

FIG. 4 discloses details regarding the hold/release function in an enlarged cut-out of FIG. 1. Only a part of the lever 306 is shown, where the two upper notches 309, 310 are shown. In between the notches the connection element 304 is shown, held by the protrusion P with its insert p. Preferably there is one off set distance "A" between the center of the connecting element and the edge of the protrusion/insert PIp to ensure a proper holding function. A play is clearly shown between the notch 309 and the connecting element ensuring that the lever 306 will be sufficiently energized in its releasing action.

The system can be regenerated after one releasing action by pushing the connecting element 304 into the slot "S" in the base element (see FIG. 1). The lever 306 will then be rotated counterclockwise until its plate 360 (FIG. 2) abuts the magnetic unit 308 and is held by said unit.

The releasable holding mechanism 302 may also have a manual release function. Such a manual function may be required if there is an electrical power failure or malfunction. Preferably one distal end of the lever 306 is accessible by a tool, which will rotate the lever 306 from the locked position to the unlocked position and release the connecting element 404. The releasable holding mechanism 302 may also provide access to the inside of the housing 328 such that distal end 312 is accessible by a tool, which will rotate the lever 306 from the locked position to the unlocked position and release the connecting element 404.

Figure 5:
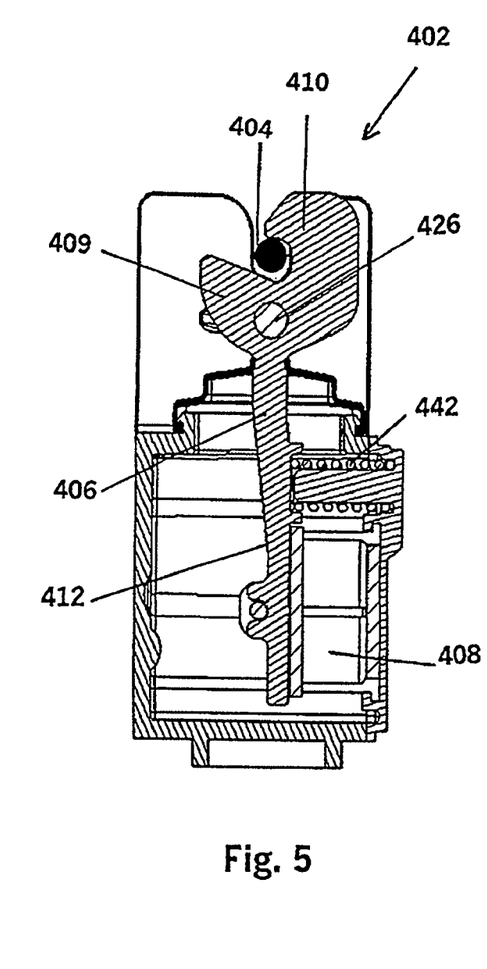
FIG. 5 is an side view of a partial cross-section of a second embodiment of a release holding mechanism and a connecting element in a locked position.
Figure 6:
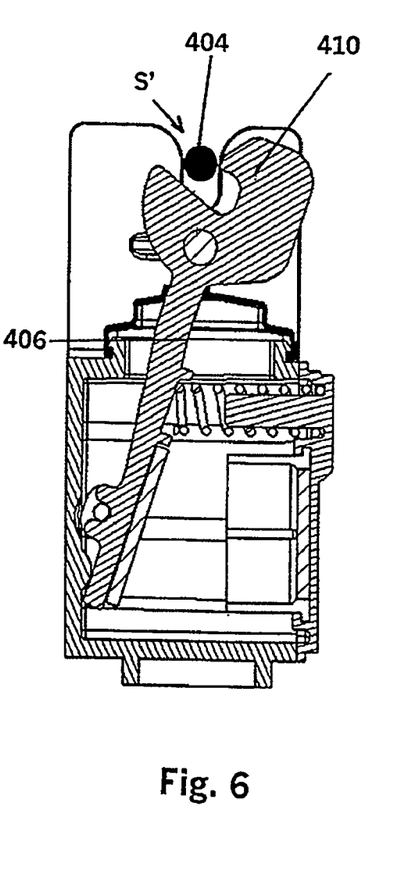
FIG. 6 is a side view of a partial cross-section of the releaseable holding mechanism and the connecting element shown in FIG. 5, in an unlocked position.
Figure 7:
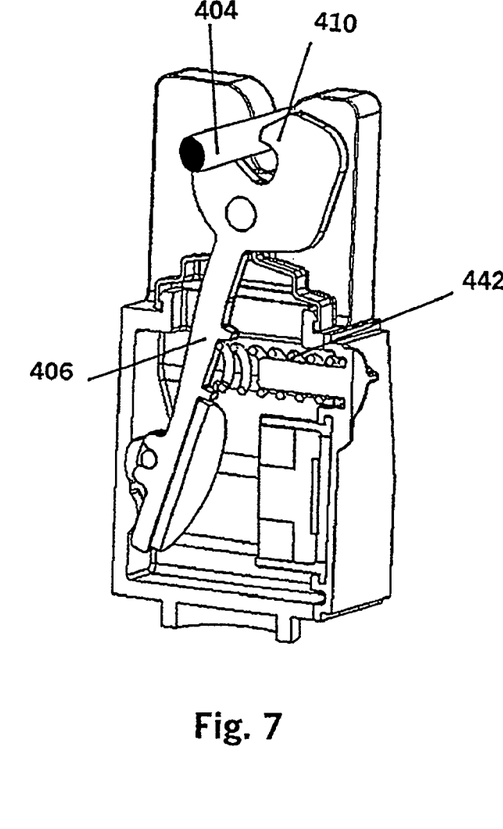
FIG. 7 is an isometric, perspective view of a partial cross-section of the releasable holding mechanism and a connecting element of FIG. 5 in an unlocked position

FIG. 5 is a side view of a partial cross-section of a further alternative embodiment of a release holding mechanism and a connecting element in a locked position. FIG. 6 is a side view of a partial cross-section of the releaseable holding mechanism and the connecting element shown in FIG. 5, in an unlocked position. FIG. 7 is an isometric, perspective view of a partial cross-section of the releasable holding mechanism and a connecting element of FIG. 5 in an unlocked position.

With reference to the FIGS. 5-7, there is shown an alternative releasable holding mechanism 402 for locking and releasing a connecting element 404. The releasable holding mechanism 402 comprises holding means for retaining the connecting element 404 in a locked position in the form of a protrusion or notch 410 at the distal end of a pivotable lever 406. The lever 406 has means for preventing movement of said lever 406 from the locked position (as shown in FIG. 5 to an unlocked position (as shown in FIG. 6) and is provided by the attractive magnetic force, for instance of a permanent magnet.

The lever 406 is capable of being influenced by a magnetic force of said permanent magnet; this magnetic force retains the lever 406 in the locked position. The axis 426 of said pivot is preferably arranged in the same base element or housing as the magnet. The releasable holding mechanism 402 comprises a combined magnet unit 408 with a permanent magnet and an electromagnet. The electromagnet can be connected to a power source (not shown) via one or more wires and is activated by a control unit (not shown).

As in the previous embodiment, the holding mechanism can be provided with a spring 442 acting upon the lever 406. The spring urges the lever to rotate about its pivot 426 in a direction away from the magnet and thus serving as an assisting force when the magnet is activated to perform a releasing action. The torque represented by the spring and acting upon the lever 406 must be lower than the holding torque or action performed by the magnet, but sufficient to (in co-operation with the torque generated by the electromagnet) move the lever 406 to retract its notch 410 that holds the connecting element 404, thus allowing the connecting element 404 to move out of the locked position beneath the notch 410, following an upwardly oriented slot "8" in the base element. A secondary notch 409 positioned beneath the connecting element will assist the regeneration of the holding action when the connecting element 404 is pushed downwardly in the slot "8", thus causing the lever 406 to rotate counterclockwise similarly to that of previous embodiment.

The release action of the connecting element 404 may be further improved by forming a slope or chamfer on the surface of the notch 410 that is in contact with the connecting element. In this embodiment of the present invention the vertical cross sectional thickness of the notch 410 reduces in the direction towards the end of the notch 410. The use of a chamfer or sloped surface will help to reduce the contact frictional force between the connecting element and the notch. The skilled person shall appreciate that the optimal angle of the chamfer may be calculated using the specific load applied to the notch by the connecting element 404 and the surface characteristics of the contacting elements.

In order to release the connecting element 404, the attractive magnetic force of the permanent magnet is reduced by creating an opposing magnetic force using the electromagnet. The electromagnet is turned on and a magnetic field is generated which counteracts and lessens the magnetic field of the permanent magnet to such an extent that the sum of the attractive force of the permanent magnet and the lateral friction force between the lever 406 and the connecting element 404 are overcome by the spring force and a turning force generated by the connecting element 404. Then the lever will rotate in a clock-wise direction to the unlocked position and release the connecting element 404 (as shown in FIGS. 6 and 7). The spring 442 will hold the second distal end 412 of lever 406 in the unlocked position away from the permanent magnet.

In case the connecting element is not pre-tensioned by the object to be locked, the secondary notch may assist the connecting element to be released as the lever 406 is put into rotation. As shown in FIG. 5 there is a gap between the secondary notch 409 in the extension of the lever 406 and the connecting element 404. The gap is preferably designed to allow the lever 406 to obtain a certain velocity before abutting the connecting element 404. Thus the lever 406 will be charged with momentum and kinetic energy by means of the spring and the magnetic resultant force before it abuts onto and moves the connecting element due to its cantilevered shape.

It should be understood that in the releasable holding mechanism, in its assembled locked position, the contact point of the connecting element on the lever can be offset from the central axis of the pivot of the lever such that the connecting element applies a turning force to the lever about the central axis of the pivot and the turning force urges the lever from the locked position to the unlocked position, or alternatively the turning force can be designed to assist the locking function.

Figure 8:
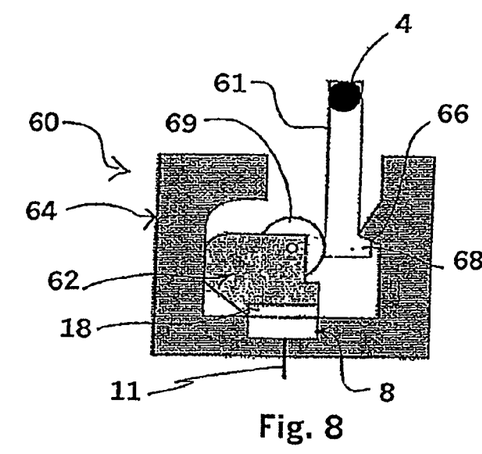
FIG. 8 is a schematic view of a partial cross-section of a third embodiment of a releasable holding mechanism and a connecting element in a locked position.
Figure 9:
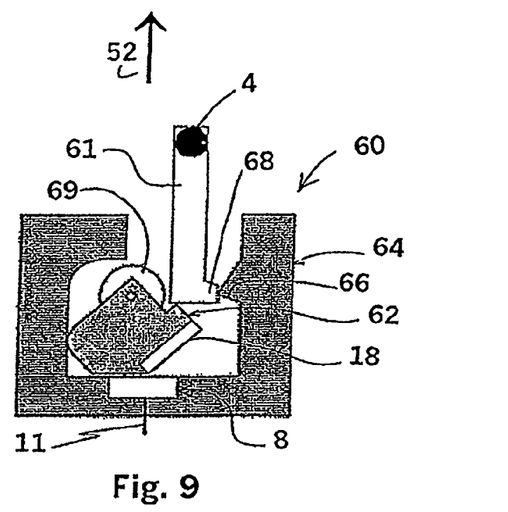
FIG. 9 is a schematic view of a partial cross-section of the releasable holding mechanism and a connecting element of FIG. 8 in an unlocked position.

With reference to FIGS. 8 and 9, there is shown a releasable holding mechanism 60 for locking and releasing a connecting element 4 that incorporates an adapter bar 61. The releasable holding mechanism 60 comprises holding means for retaining the connecting element 4 in a locked position in the form of a tiltable roll bar adapter 62 and means for preventing movement of the roll bar adapter 62 from the locked position to an unlocked position is provided by the attractive magnetic force of a permanent magnet, the arrangement being such that in the locked position the roll bar adapter 62 is urged towards the unlocked position by the adapter bar 61 and the connecting element 4. The roll bar adapter 62 is capable of being influenced by a magnetic force of the permanent magnet; this magnetic force retains the roll bar adapter 62 in the locked position. The releasable holding mechanism 60 comprises a combined magnet unit 8 comprising a permanent magnet and an electromagnet. The electromagnet is connected to a power source (not shown) via a wire 11 and is activated by a control unit (not shown).

The releasable holding mechanism 60 comprises a housing 64 formed with a ramp extension 66 on the inner wall of the housing. At the lower distal end of the adapter bar 61 there is formed a foot section 68. The foot section 68 is adapted to be in a slideable contact with the ramp extension 66.

In the locked position the foot section 68 of the adapter bar 61 is locked between the ramp extension 66 and a wheel 69 which forms part of the roll bar adapter 62. The roll bar adapter 62 is retained in the locked position by the permanent magnet.

To release the connecting element 4 the electromagnet is energised to generate a magnetic field that opposes the field of the permanent magnet and the resultant magnetic field is not sufficiently strong to hold the roll bar adapter 62. The roll bar adapter 62 will then rotate away from the adapter bar 61. The adapter bar 61 slides along the ramp extension 66 until the adapter bar 61 has cleared the ramp extension 66 and the connection element 4 and adapter bar 61 are released. A spring may be used to hold the roll bar adapter 62 in the open unlocked position. In the open unlocked position the bar adapter 61 may be inserted back into the housing 64 and the bar adapter 61 will contact the roll bar adapter 62 and rotate the roll bar adapter 62 back into the locked position.

Figure 10:
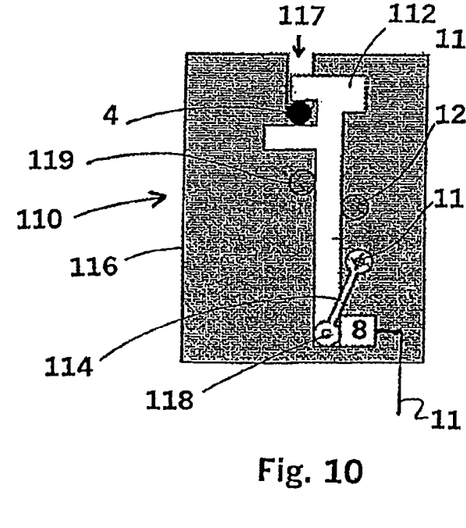
FIG. 10 is a schematic view of a partial cross-section of a fourth embodiment of a releasable holding mechanism and a connecting element in a locked position.
Figure 11:
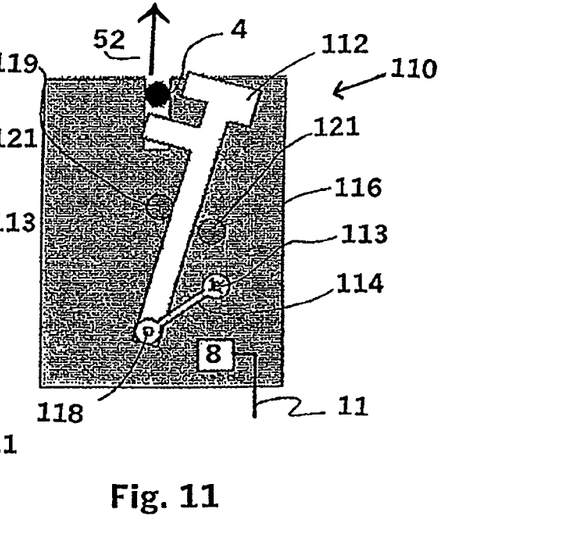
FIG. 11 is a schematic view of a partial cross-section of the releasable holding is mechanism and a connecting element of FIG. 10 in an unlocked position.

With reference to FIGS. 10 and 11, there is shown a releasable holding mechanism 110 for locking and releasing a connecting element 4. The releasable holding mechanism 110 comprises holding means for retaining the connecting element 4 in a locked position in the form of two pivotable levers 112, 114 and means for preventing movement of two pivotable levers 112, 114 from the locked position (as shown in FIG. 10) to an unlocked position (as shown in FIG. 11) is provided by the attractive magnetic force of a permanent magnet, the arrangement being such that in the locked position the two pivotable levers 112, 114 are urged towards the unlocked position by the connecting element 4. The pivotable lever 112 is capable of being influenced by a magnetic force of the permanent magnet; this magnetic force retains the two pivotable levers 112, 114 in the locked position. The releasable holding mechanism 110 comprises a combined magnet unit 8 comprising a permanent magnet and an electromagnet. The electromagnet is connected to a power source (not shown) via a wire 11 and is activated by a control unit (not shown).

The releasable holding mechanism 110 comprises a housing 116 formed with an access slot 117. The pivotable lever 112 is pivotable about a pivot shaft 118 that is not fixed to the housing 116 and one end of the pivotable lever 114 is pivotable about the pivot shaft 118 and the other end of the lever 114 is pivotable about a pivot shaft 113 that is fixed to the housing 116. The mechanism 110 also comprises two guides 119, 121 each disposed either side of, and are in slideable contact with, the lever 112.

To release the connecting element 4 the electromagnet is energised to generate a magnetic field that opposes the field of the permanent magnet and the resultant magnetic field is not sufficiently strong to hold the two pivotable levers 112, 114. The pivotable levers 112, 114 will then rotate away from the adapter bar magnet unit 8 and the connecting element 4 will be released and move in direction 52. A spring may be used to hold the pivotable levers 112, 114 in the open unlocked position. In the open unlocked position the connecting element 4 may be inserted back into the access slot 117 of the housing 116 and the connecting element 4 will contact the lever 112 and the two pivotable levers 112, 114 can rotate back into the locked position.

Figure 12:
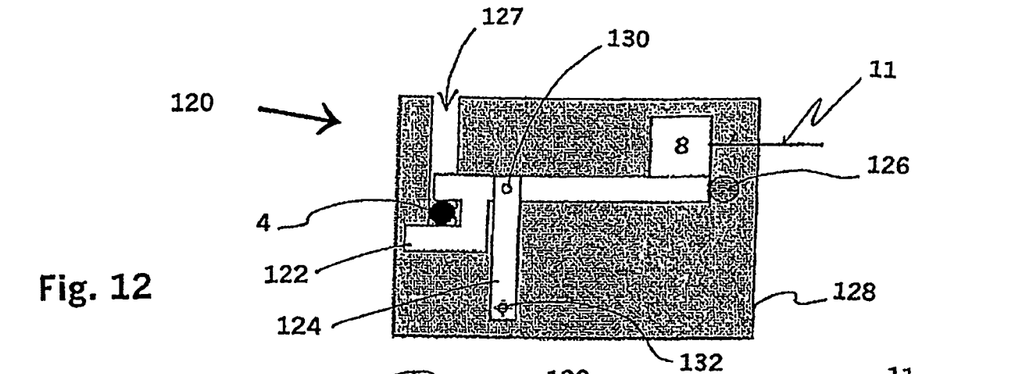
FIG. 12 is a schematic view of a partial cross-section of a fifth embodiment of a releasable holding mechanism and a connecting element in a locked position.
Figure 13:
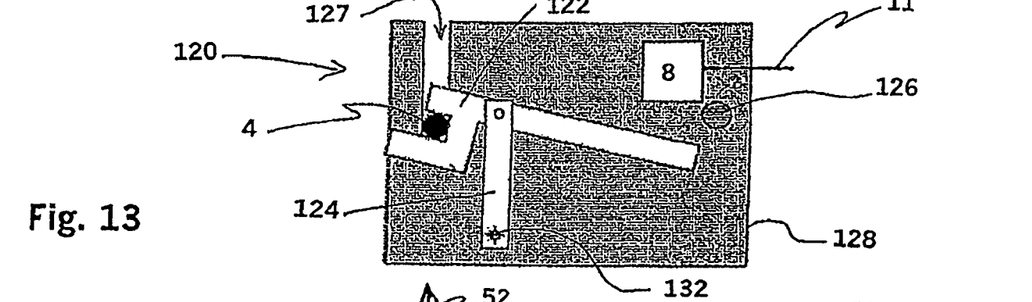
FIG. 13 is a schematic view of a partial cross-section of the releasable holding mechanism and a connecting element of FIG. 12 in a partially unlocked position.
Figure 14:
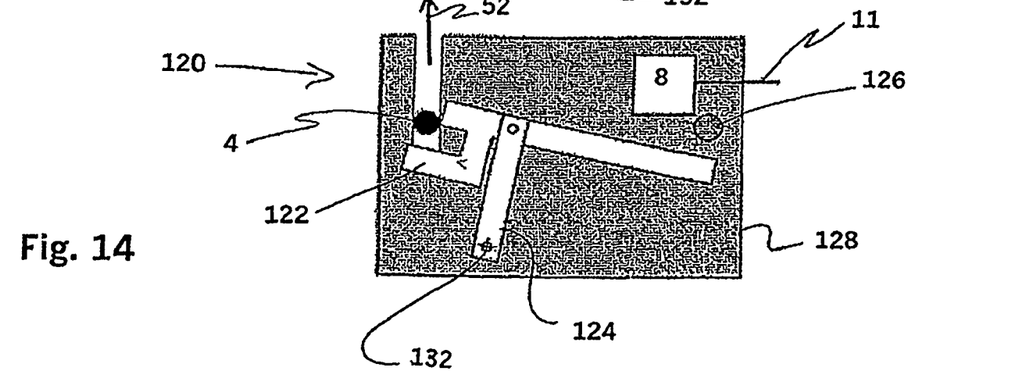
FIG. 14 is a schematic view of a partial cross-section of the releasable holding mechanism and a connecting element of FIG. 12 in an unlocked position.

With reference to FIGS. 12 to 14, there is shown a releasable holding mechanism 120 for locking and releasing a connecting element 4. The releasable holding mechanism 120 comprises holding means for retaining the connecting element 4 in a locked position in the form of two pivotable levers 122, 124 and a stop element 126 and means for preventing movement of two pivotable levers 122, 124 from the locked position (as shown in FIG. 12) to an unlocked position (as shown in FIG. 14) is provided by the attractive magnetic force of a permanent magnet, the arrangement being such that in the locked position the two pivotable levers 122, 124 are urged towards the unlocked position by the connecting element 4. The pivotable lever 124 is capable of being influenced by a magnetic force of the permanent magnet; this magnetic force retains the two pivotable levers 122, 124 in the locked position. The releasable holding mechanism 120 comprises a combined magnet unit 8 comprising a permanent magnet and an electromagnet. The electromagnet is connected to a power source (not shown) via a wire 11 and is activated by a control unit (not shown).

The releasable holding mechanism 120 comprises a housing 128 formed with an access slot 127. The pivotable levers 122, 124 are pivotable about a pivot shaft 130 that is not fixed to the housing 128. One end of the pivotable lever 124 is pivotable about the pivot shaft 130 and the other end of the lever 124 is pivotable about a pivot shaft 132 that is fixed to the housing 128. The mechanism 120 also comprises the stop element 126 that is disposed at one end of the lever 122 and is in slideable contact with, the lever 122.

To release the connecting element 4 the electromagnet is energised to generate a magnetic field that opposes the field of the permanent magnet and the resultant magnetic field is not sufficiently strong to hold the two pivotable levers 122, 124. The pivotable levers 122, 124 will then rotate away from the adapter bar magnet unit 8 and the connecting element 4 will be released and move in direction 52. A spring may be used to hold the pivotable levers 122, 124 in the open unlocked position. In the open unlocked position the connecting element 4 may be inserted back into the access slot 127 of the housing 128 and the connecting element 4 will contact the lever 122 and the two pivotable levers 122, 124 can rotate back into the locked position.

Figures 15, 16:
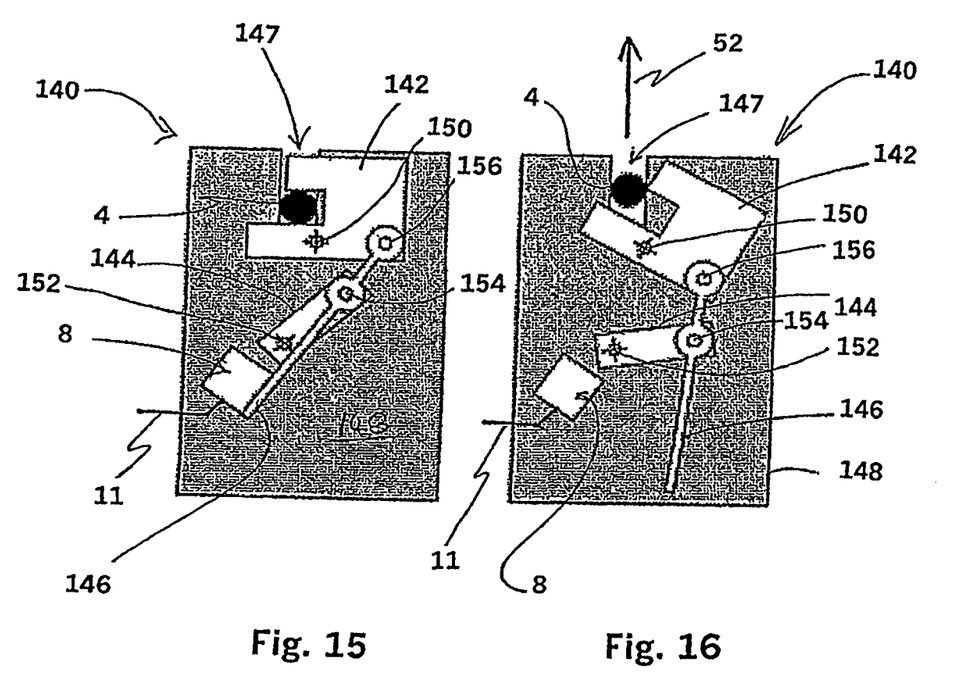
FIG. 15 is a schematic view of a partial cross-section of a sixth embodiment of a releasable holding mechanism and a connecting element in a locked position.
FIG. 16 is a schematic view of a partial cross-section of the releasable holding mechanism and a connecting element of FIG. 15 in an unlocked position.

With reference to FIGS. 15 and 16, there is shown a releasable holding mechanism 140 for locking and releasing a connecting element 4. The releasable holding mechanism 140 comprises holding means for retaining the connecting element 4 in a locked position in the form of three pivotable levers 142, 144, 146 and means for preventing movement of the pivotable levers 142, 144, 146 from the locked position (as shown in FIG. 15) to an unlocked position (as shown in FIG. 16) is provided by the attractive magnetic force of a permanent magnet, the arrangement being such that in the locked position the pivotable levers 142, 144, 146 are urged towards the unlocked position by the connecting element 4. The pivotable lever 146 is capable of being influenced by a magnetic force of the permanent magnet; this magnetic force retains the two pivotable levers 142, 144, 146 in the locked position. The releasable holding mechanism 140 comprises a combined magnet unit 8 comprising a permanent magnet and an electromagnet. The electromagnet is connected to a power source (not shown) via a wire 11 and is activated by a control unit (not shown).

The releasable holding mechanism 140 comprises a housing 148 formed with an access slot 147. The pivotable lever 142 is pivotable about a pivot shaft 150 that is fixed to the housing 148. One end of the pivotable lever 144 is pivotable about a pivot shaft 152 that is fixed to the housing 148 and the other end of the lever 144 is pivotable about a pivot shaft 154 that is not fixed to the housing 148 but is connected to a midsection of the lever 146. One end of the lever 146 is connected to the lever 142 by a pivot 156. The pivot 156 is not connected to the housing 148.

To release the connecting element 4 the electromagnet is energised to generate a magnetic field that opposes the field of the permanent magnet and the resultant magnetic field is not sufficiently strong to hold the three pivotable levers 142, 144, 146. The pivotable levers 142, 144, 146 will then rotate about their respective pivots and the connecting element 4 will be released and move in direction 52. A spring may be used to hold the pivotable levers 142, 144, 146 in the open unlocked position. In the open unlocked position the connecting element 4 may be inserted back into the access slot 147 of the housing 148 and the connecting element 4 will contact the lever 142 and the three pivotable levers 142, 144, 146 can rotate back into the locked position.

Figure 17:
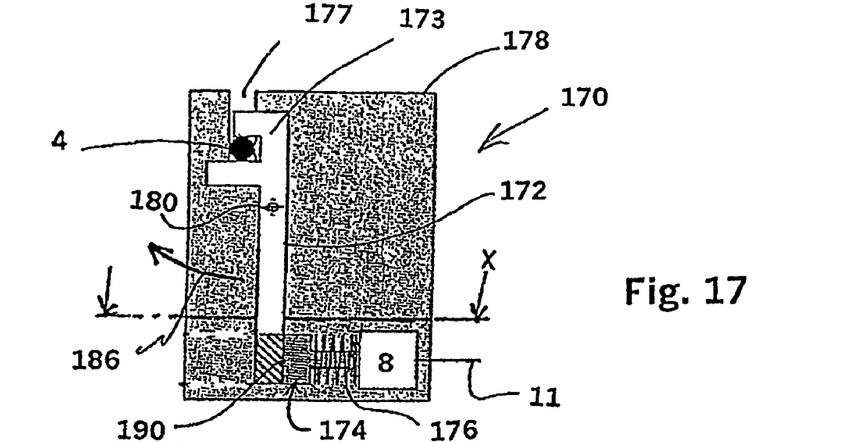
FIG. 17 is a schematic view of a partial cross-section of a seventh embodiment of a releasable holding mechanism and a connecting element in a locked position.
Figure 18:
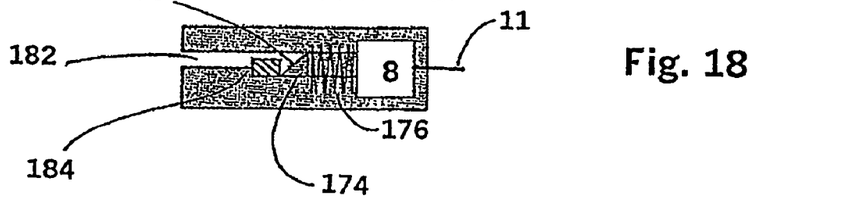
FIG. 18 is a schematic plan view of a cross-section through X-X of the lower section of the releasable holding mechanism and a connecting element shown in FIG. 17.
Figure 19:
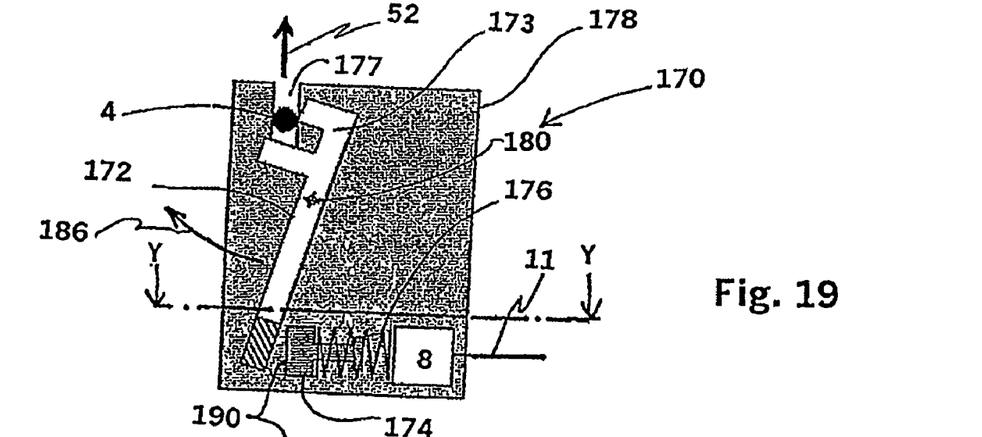
FIG. 19 is a schematic view of a partial cross-section of the releasable holding mechanism and a connecting element of FIG. 17 in an unlocked position.

With reference to FIGS. 17 to 20, there is shown a releasable holding mechanism 170 for locking and releasing a connecting element 4. The releasable holding mechanism 170 comprises holding means for retaining the connecting element 4 in a locked position in the form of a pivotable lever 172 and a slideable element 174 and means for preventing movement of the pivotable lever 172 and the slideable element 174 from the locked position (as shown in FIG. 17) to an unlocked position (as shown in FIG. 19) is provided by the attractive magnetic force of a permanent magnet, the arrangement being such that in the locked position the pivotable lever 172 and the slideable element 174 are urged towards the unlocked position by the connecting element 4 and a spring element 176. The slideable element 174 is capable of being influenced by a magnetic force of the permanent magnet; this magnetic force retains the pivotable lever 172 and the slideable element 174 in the locked position. The releasable holding mechanism 170 comprises a combined magnet unit 8 comprising a permanent magnet and an electromagnet. The electromagnet is connected to a power source (not shown) via a wire 11 and is activated by a control unit (not shown).

The releasable holding mechanism 170 comprises a housing 178 formed with a substantially vertical access slot 177 in the upper part and a lower channel 182 extending substantially perpendicular to the slot 177. The lower channel 182 is formed with step 184 about half away along the length of the channel 182 such that the channel 182 has a narrower section extending from the step 184 in a direction towards the end of the housing 178. The slideable element 174 is contained within the wider part of the lower channel 182. The slideable element 174 is formed with a sloped distal end 190. The pivotable lever 172 is pivotable about a pivot shaft 180, which is attached to the housing 178. The spring 176 is disposed between the magnet unit 8 and the sloped distal end 190 and in the locked position the compressed spring 176 urges the slideable element 174 in a direction away from the magnet unit 8. In the locked position, a lower end of the lever 172 is in contact with the step 184.

To release the connecting element 4 the electromagnet is energised to generate a magnetic field that opposes the field of the permanent magnet and the resultant magnetic field is not sufficiently strong to hold the slideable element 174 against the force of the spring 176. The slideable element 174 moves in a direction away from the magnet unit 8 and raises the pivotable lever 172 over the step 184 and the lever 172 will then rotate away from the adapter bar magnet unit 8 in direction 186 and the connecting element 4 will be released and move in direction 52.

Figure 20:
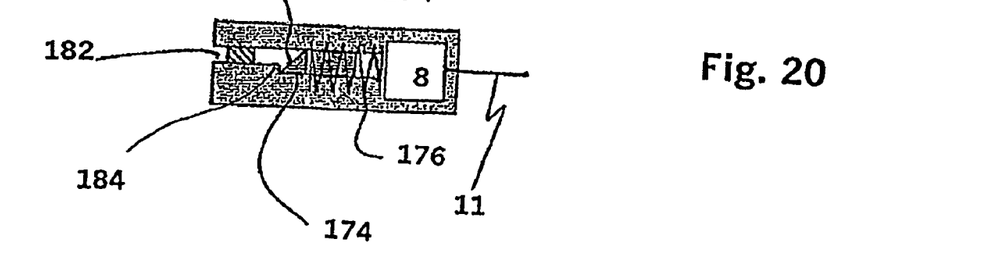
FIG. 20 is a schematic plan view of a cross-section through Y-Y of the lower section of the releasable holding mechanism and a connecting element shown in FIG. 19.

In the open unlocked position, the connecting element 4 may be inserted back into the access slot 177 of the housing 178 and the connecting element 4 will contact the lever 172 and rotate the pivotable lever 172 back into the locked position abutting the step 184. The lever 172 is formed with a substantially 'C' shaped end 173 and the element 4 comes into contact with the lower part of the 'C' shaped end as the element 4 is inserted back into the slot 177. It shall be appreciated that the majority of the embodiments described include a similar 'C' shaped end that is utilized to move the mechanism from the unlocked position to the locked position.

Figure 21:
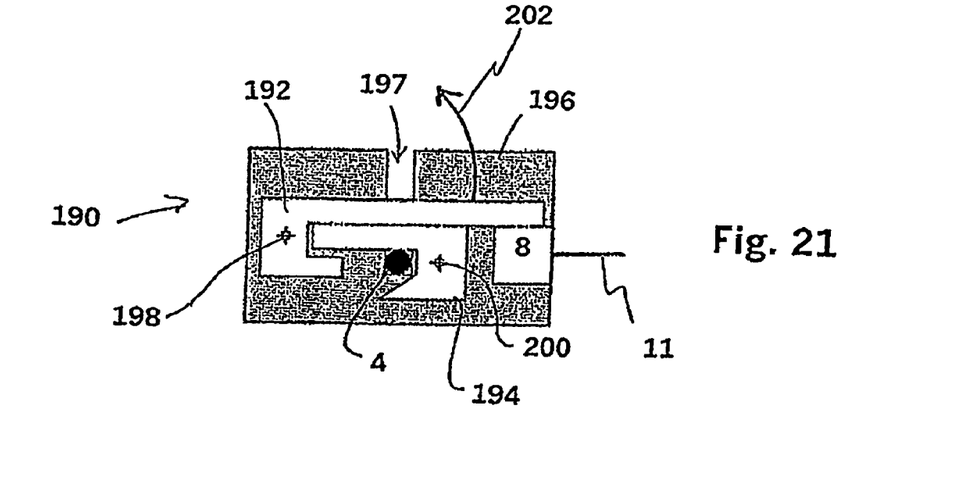
FIG. 21 is a schematic view of a partial cross-section of an eight embodiment of a releasable holding mechanism and a connecting element in a locked position.
Figure 22:
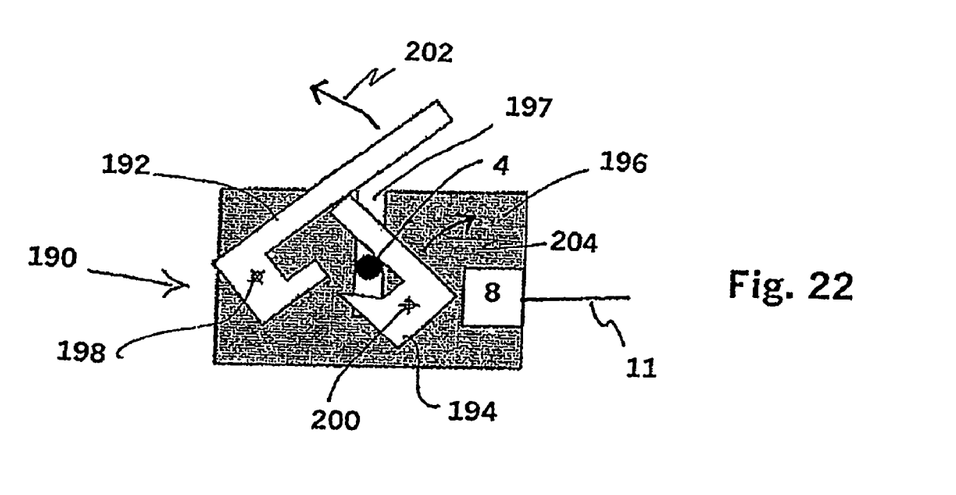
FIG. 22 is a schematic view of a partial cross-section of the releasable holding mechanism and a connecting element of FIG. 21 in a partially unlocked position.
Figure 23:
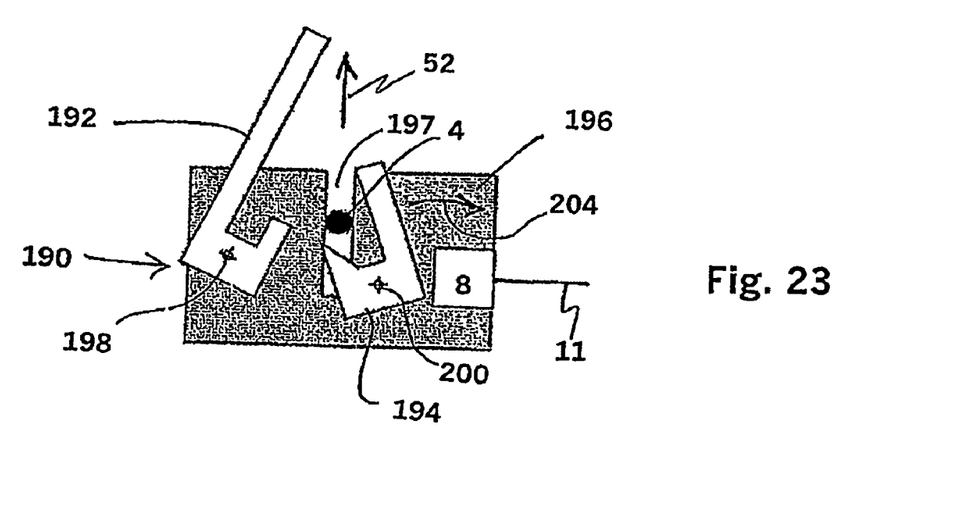
FIG. 23 is a schematic view of a partial cross-section of the releasable holding mechanism and a connecting element of FIG. 21 in an unlocked position.

With reference to FIGS. 21 to 23, there is shown a releasable holding mechanism 190 for locking and releasing a connecting element 4. The releasable holding mechanism 190 comprises holding means for retaining the connecting element 4 in a locked position in the form of two pivotable levers 192, 194 and means for preventing movement of two pivotable levers 192, 194 from the locked position (as shown in FIG. 21) to an unlocked position (as shown in FIG. 23) is provided by the attractive magnetic force of a permanent magnet, the arrangement being such that in the locked position the two pivotable levers 192, 194 are urged towards the unlocked position by the connecting element 4. The pivotable lever 192 is capable of being influenced by a magnetic force of the permanent magnet; this magnetic force retains the two pivotable levers 192, 194 in the locked position. The releasable holding mechanism 190 comprises a combined magnet unit 8 comprising a permanent magnet and an electromagnet. The electromagnet is connected to a power source (not shown) via a wire 11 and is activated by a control unit (not shown).

The releasable holding mechanism 190 comprises a housing 196 formed with an access slot 197. The two pivotable levers 192, 194 are pivotable about respective pivot shafts 198, 200 that are each connected to the housing 196.

To release the connecting element 4 the electromagnet is energised to generate a magnetic field that opposes the field of the permanent magnet and the resultant magnetic field is not sufficiently strong to hold the two pivotable levers 192, 194. The pivotable lever 192 will then rotate away from the adapter bar magnet unit 8 in an anticlockwise direction 202 and the pivotable lever 194 will be released by the lever 192. The lever 194 will then rotate in a clockwise direction 204 and the connecting element 4 will be released and move in direction 52. Respective spring may be used to hold each of the pivotable lever 192, 194 in the open unlocked position.

In the open unlocked position, the connecting element 4 may be inserted back into the access slot 197 of the housing 196 and the connecting element 4 will contact the lever 194 and the two pivotable levers 192, 194 can rotate back into the locked position.

Figure 24:
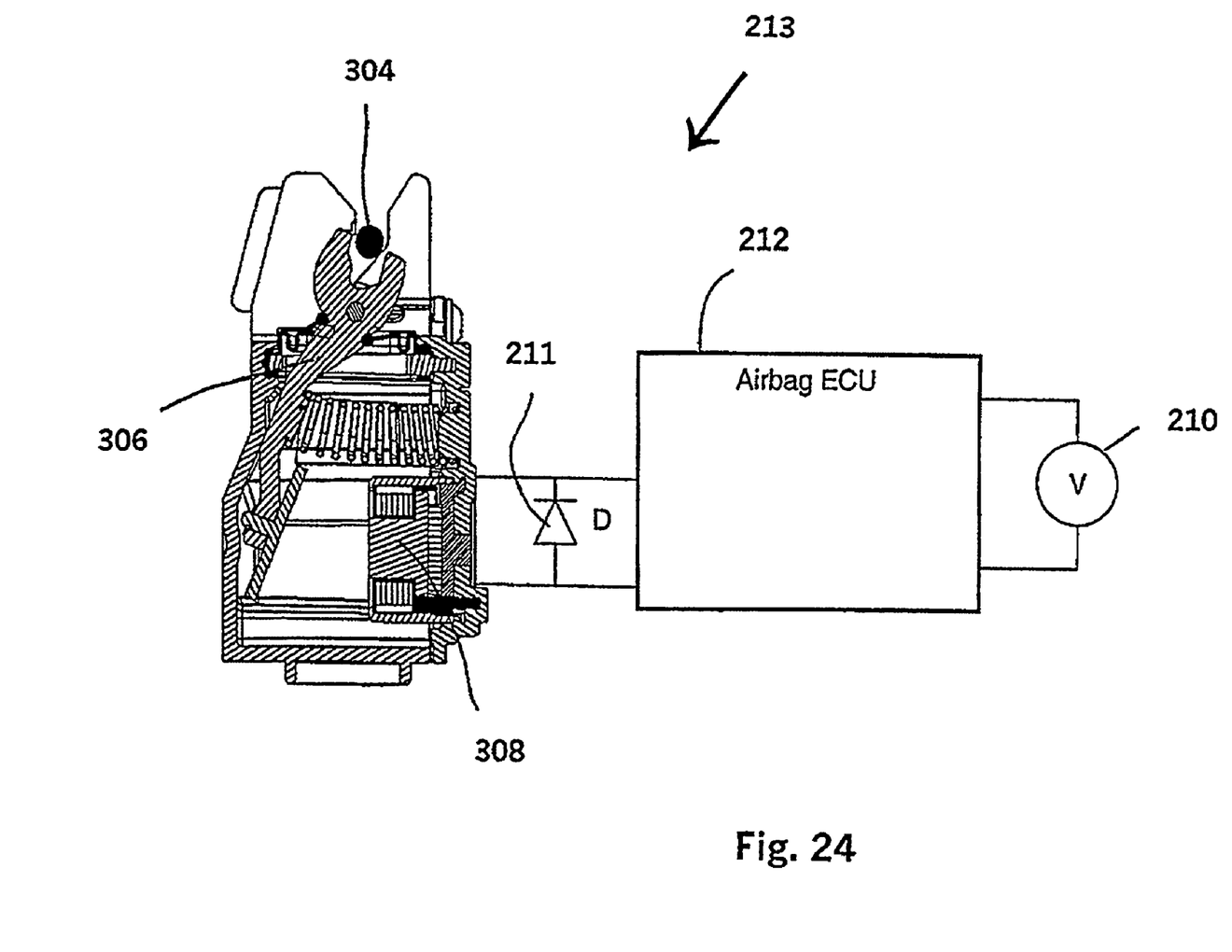
FIG. 24 is a schematic view of an arrangement for activation of the releasable holding mechanism.

FIG. 24 discloses main components in the releasable holding mechanism such as a lever 306 and a connecting element 304. Here, the lever 306 is kept in a locked position by means of a permanent magnet. Further, there is shown an arrangement for activation of the releasable holding mechanism, by energizing the coil of the electromagnet by means of an electrical pulse. The pulse can be provided by an airbag electronic controller unit (ECU). The main components in the embodiment shown are one electronic controller unit 212, being powered by a source of voltage 210. One diode 211 of the freewheeling type is arranged in parallel with and connected to two leads interconnecting the ECU and the coil in the magnet unit 308 in the low energy actuator (LEA) 213.

The coil and associated ferromagnetic material have an inherent electrical resistance and inductance. Some of the applied energy in a short transient pulse from the airbag ECU is lost in eddy induced currents in the ferromagnetic material in the coil, some is lost into heat, and the remainder contributes to an electromagnetic field around the coil. When the airbag ECU triggers due to a sensor input (charge region), the ECU seeks to provide a defined electrical current (or voltage) across the coil of the LEA.

The current increases toward the target current and finally stabilizes at that current, thus enabling the electromagnet to establish a magnetic field that in whole or partially neutralizes the permanent magnet field in the LEA.

When the trigger output from the airbag ECU ends (discharge region), the stored electrical inductance energy in the LEA electromagnet is allowed to maintain a current due to the diode. This effectively extends the duration of release signal for LEA since the electromagnetic field is extended in time, although decreasing with decreasing current.

It should be understood that the LEA could also be energized by other controlling units than that of the above mentioned embodiment, where appropriate.

Further, it should be understood that the holding force in the abovementioned embodiments is preferably sustained by a permanent magnet. However, such holding force can also be generated by means of snap fasteners or snap couplings, "Velcro" locks, non-hardening glue or any other appropriate regenerative fastening means.

The invention claimed is:

1. A releasable holding mechanism for locking and releasing a connecting element, said releasable holding mechanism comprising:
   a holding unit configured to retain the connecting element in a locked position, said holding unit comprising at least one stationary protrusion and one pivotable lever with at least one notch;
   a release unit configured to release the connecting element, said release unit being configured to assert a first force so as to maintain the connecting element in a locked position;
   an activating element configured to release said release unit; and
   a spring configured to charge the pivotable lever with momentum and kinetic energy,
   wherein said release unit is configured to hold the connecting element in a locked position by the first force until said release unit is released by said activating element,
   wherein said holding unit is arranged such that in the locked position a portion of said stationary protrusion is in operative engagement with the connecting element, and
   wherein said pivotable lever is arranged such that a gap is formed between an inward lef of said notch of said pivotable lever and the connecting element, such that said pivotable lever is capable of obtaining a certain velocity before abutting the connecting element.

2. A releasable holding mechanism as claimed in claim 1, wherein said release unit is configured to apply the first force such that the first force is a substantially constant, limited force.

3. A releasable holding mechanism as claimed in claim 1, wherein said release unit comprises an electromagnet controlled by an electrical signal.

4. A releasable holding mechanism as claimed in claim 1, wherein said release unit is configured to assert a first static force so as to provide the first force for retaining the connecting element in a locked position and where a electromagnet is energized and provides an opposing force to the first force for the release of the connecting element.

5. A releasable holding mechanism as claimed in claim 4, wherein said release unit includes a permanent magnet.

6. A releasable holding mechanism as claimed in claim 1, wherein said release unit includes an electromagnet and a power source configured to provide a first magnetic force for maintaining the connecting element in a locked position, and where the connecting element is released by the de-energizing or change of polarity of a signal to said electromagnet.

7. A releasable holding mechanism as claimed in claim 6, wherein said power source is an electronic control unit (ECU) that delivers an electrical pulse to said electromagnet.

8. A releasable holding mechanism as claimed in claim 7, wherein the electrical pulse is of limited duration.

9. A releasable holding mechanism as claimed in claim 8, wherein the pulse is between 0.5-2 milliseconds.

10. A releasable holding mechanism as claimed in claim 7, wherein a diode is connected across wire leads connecting a coil of said electromagnet with said ECU, to prolong the duration of the electrical pulse.

11. A releasable holding mechanism as claimed in claim 7, wherein said ECU is arranged in a vehicle for activation of a crash protection device.

12. A releasable holding mechanism as claimed in claim 11, wherein the crash protection device is at least one air bag.

13. A releasable holding mechanism as claimed in claim 1, wherein a distal end of said pivotable lever is in operative association with, and retainable by, the first force.

14. A releasable holding mechanism as claimed in claim 13, wherein said release unit includes a permanent magnet.

15. A releasable holding mechanism as claimed in claim 13, wherein said release unit includes a permanent magnet attached to a housing, said permanent magnet being arranged such that, in use, said distal end of the pivotable lever is separated from said permanent magnet and moves in a direction away from said permanent magnet when said pivotable lever moves from the locked position to the unlocked position.

16. An automotive roll over protection system comprising a releasable holding mechanism as claimed in claim 1, wherein said connecting element is part of said automotive roll over protection system, said releasable holding mechanism being usable to retain and release a roll bar of said roll over protection system, said holding mechanism being arranged such that, in use, in response to a release signal being sent to said holding mechanism, said holding mechanism releases said connecting element and said roll bar of said roll over protection system is raised.

* * * * *